Figure 1:
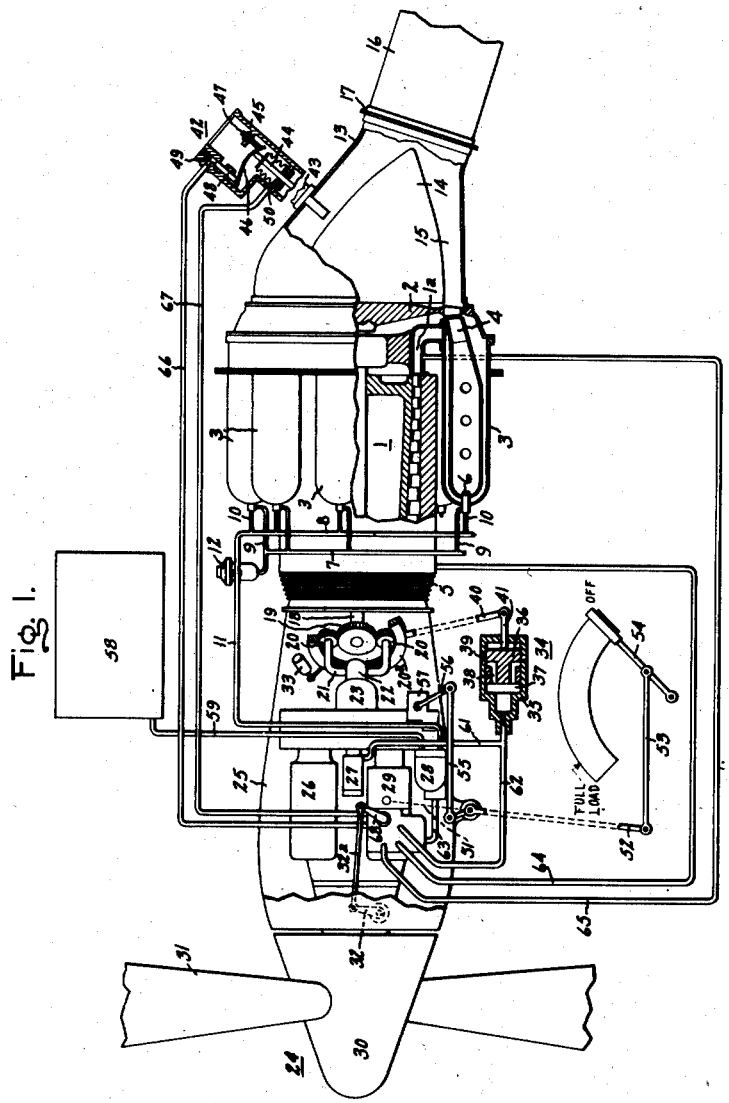

July 14, 1953  H. M. OGLE ET AL  2,645,293
APPARATUS FOR REGULATING PROPULSION POWER PLANTS
Filed Sept. 14, 1946  2 Sheets-Sheet 1

Inventors:
Hugh M. Ogle
Donald E. Garr
Martin A. Edwards,
by *Prowell Mack*
Their Attorney.

Inventors:
Hugh M. Ogle
Donald E. Garr
Martin A. Edwards,
by Prowell F. Mark
Their Attorney.

Patented July 14, 1953

2,645,293

UNITED STATES PATENT OFFICE 2,645,293

APPARATUS FOR REGULATING PROPULSION POWER PLANTS

Hugh M. Ogle and Donald E. Garr, Schenectady, and Martin A. Edwards, Scotia, N. Y., assignors to General Electric Company, a corporation of New York Application September 14, 1946, Serial No. 697,058

10 Claims. (Cl. 170—135.72)

This invention relates to regulating means for prime mover powerplants, particularly to those for effecting the propulsion of a body in a fluid medium through the agency of a variable propeller. While not necessarily limited thereto, it is particularly adapted for the control of gas turbine powerplants for the propulsion of aircraft by a variable pitch propeller.

In applying gas turbine powerplants to the propulsion of aircraft, it is possible to arrange the powerplant to effect propulsion by the pure jet reaction of the hot gases exhausted from the powerplant through a suitable nozzle. Powerplants of this type are disclosed in applications Serial No. 525,391, filed March 7, 1944 in the name of Dale D. Streid, Patent 2,432,359, and Serial No. 541,565, filed June 22, 1944 in the name of Alan Howard. It is also possible to arrange the powerplant to drive a variable pitch propeller, the major portion of the useful output of the powerplant being delivered to the propeller through suitable gearing, while a smaller portion produces useful thrust by the jet reaction of the gases exhausted from the powerplant through a propulsion nozzle directed rearwardly. An aircraft gas turbine of this type is disclosed in application Serial No. 506,930, filed October 20, 1943, in the name of Alan Howard now U. S. Patent No. 2,479,573 of August 23, 1949.

Our prior application Serial No. 605,960, filed July 19, 1945, now U. S. Patent No. 2,622,393 of December 12, 1952 disclosed a regulating system particularly adapted for pure jet propulsion powerplants of the type described in the above-mentioned Streid Patent No. 2,432,359. The present invention has some features in common, but is particularly adapted to the control of a powerplant of the type described in the above-mentioned Howard Patent No. 2,479,573, in which the gas turbine drives a suitable variable pitch propeller.

The general object of the invention is to provide an improved method and apparatus for controlling a prime mover powerplant for driving an adjustable torque load device, such as an adjustable pitch propeller for propulsion of a body in a fluid medium.

A specific object is to provide a regulating system for a powerplant of the type described which controls the supply of operating medium to maintain the rotational speed constant and varies the load output by adjusting the torque input to the load device, means being provided for the direct manual control of the operating medium supply during the starting cycle.

A further object is to provide regulating apparatus of the type described which is adapted for effectively controlling turbine powerplants having rotors of large rotational inertia.

Still another object is to provide a high temperature turbine powerplant regulator including automatic safety devices for preventing excessive temperatures.

Another object is to provide an improved regulator of the type described for an aircraft gas turbine powerplant driving an adjustable pitch propeller in which the torque control means and the motive fluid control means are automatically recalibrated in accordance with changes in altitude and certain other operating conditions of the powerplant.

Figure 2:
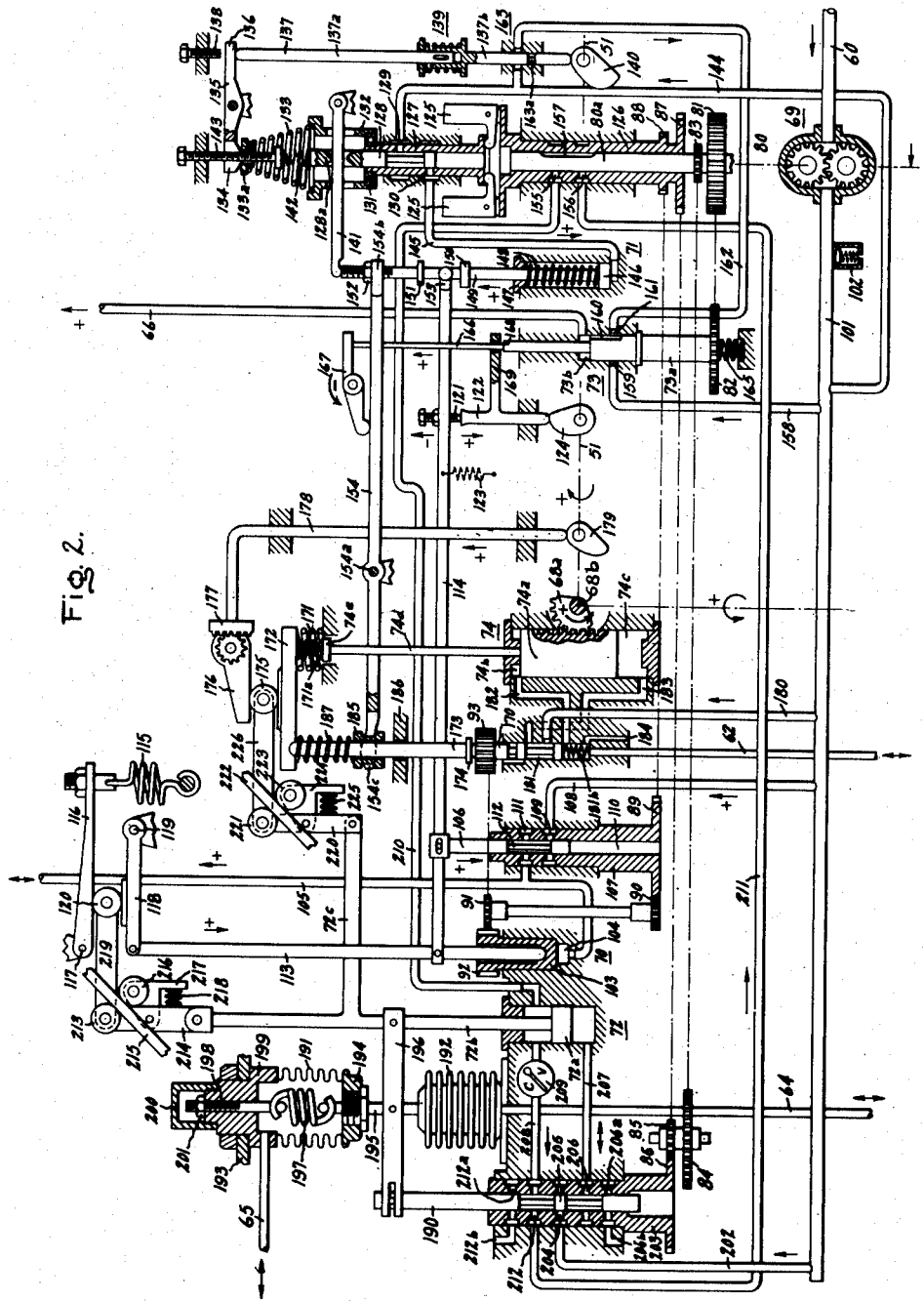

Other objects and advantages will be apparent from the following description taken in connection with the accompanying drawings, in which Fig. 1 is a diagrammatic representation of an aircraft gas turbine powerplant arranged to be controlled by a regulating system in accordance with our invention; and Fig. 2 is a schematic representation of a regulator for effecting our improved method of control.

Since the advent of the gas turbine propulsion powerplant for aircraft, many studies have been made to determine the best method of utilizing the output of the powerplant in order to secure the best over-all propulsive efficiency. The consensus of opinion resulting from these studies has been that for aircraft speeds below 600 miles per hour a variable pitch propeller receiving the major portion of the useful output of the powerplant promises the best efficiency.

Introducing the variable pitch geared propeller into the propulsion system carries with it many new problems. Existing variable pitch air-screws and the means for controlling them, designed for use with reciprocating internal combustion engines, have been found to be not directly applicable to use in connection with turbine prime movers. When a variable pitch propeller is used with a conventional reciprocating engine, the rotational inertia of the propeller itself is much greater than that of the moving parts of the reciprocating engine. Therefore, the speed of the reciprocating engine can be readily and quickly controlled by varying the pitch of the propeller, a small change in pitch having an immediate effect on the engine speed. On the other hand, the rotational inertia of the gas turbine rotor and parts connected to it is many times that of the propeller. Therefore, a change in propeller pitch affects the rotational speed of the powerplant only after an appreciable time lag. For this reason, it is not readily feasible to control powerplant speed by adjusting the propeller pitch and relying upon changes in propeller shaft torque to produce a speed change in the desired direction.

It may also be noted that a reciprocating internal combustion engine is capable of operating over a wide range of speeds without adversely affecting the engine, both the full load and cruising speeds being a fraction of the maximum permissible speed which the engine structure will stand. On the other hand, with a gas turbine powerplant the efficiency and fuel economy increase progressively with an increase in speed so that it is desirable to operate the powerplant at a constant speed which is as close as possible to the maximum safe operating speed. With the speed maintained constant, the load may be varied from the "cruising" or maximum economy value to the "full load" or maximum output value by regulating the fuel supply to vary the temperature level at which the powerplant operates. Because of the high temperatures at which the turbine rotor and other components operate, in combination with the fact that the normal speed is established as close as possible to the maximum permissible speed, transient over-speed conditions must be very carefully prevented; since even a temporary over-speed of a few per cent may result in the destruction of the engine and perhaps the aircraft. When used in high altitude aircraft, it is of course necessary that the powerplant operate over an extremely wide range of atmospheric conditions and loads. With the many complex factors which must be taken into consideration, and in view of the enormous forces to be controlled, a satisfactory regulating system must be capable of effecting its functions very precisely and with the utmost reliability.

The present invention provides a new method and apparatus for controlling a propeller propulsion powerplant of the type described which appears to meet adequately the exacting requirements outlined above.

In contrast to previously known regulating systems for prime movers driving automatic adjustable pitch propellers, our invention comprises means for holding the powerplant speed constant and causing the propeller pitch control means to vary the pitch of the blades so as to maintain the propeller shaft torque constant at a value corresponding to the desired horsepower output. To this end our regulator includes a centrifugal speed responsive governor arranged to vary the fuel input to the powerplant so as to limit the rotational speed. A device responsive to the propeller shaft torque transmits a signal to the regulator which in turn actuates the propeller pitch control in such a manner as to maintain the shaft torque constant. As in the regulator described in our previous application referred to above, means are provided for recalibrating the regulator in accordance with ambient atmospheric conditions so that for all altitudes and inlet conditions the full load position of the operator's throttle will produce the maximum permissible load at that altitude, while any given intermediate position of the throttle will always produce a predetermined percentage of the full load setting. Means are also provided for preventing excessive rotational speed of the powerplant, as well as operation at excessive temperature levels. Special means are provided for recalibrating the regulator so as to call for less propeller shaft torque in the event operating conditions are such that the output called for by the operator cannot be safely attained without producing an excessive temperature level. Suitable manual control means are provided, with linkages connecting the various components of the regulating system so arranged that during starting the fuel pressure is controlled manually; then when the speed rises to a preselected value, the speed responsive governor comes into control; and after substantially full rated speed is attained, the load is varied by changing the propeller pitch to vary the shaft torque.

Referring now to Fig. 1, our control system is represented as applied to an aircraft gas turbine of the type described in the above-mentioned application of Alan Howard, Serial No. 506,930, now Patent No. 2,479,573. The powerplant comprises an axial flow compressor 1 mounted on a common shaft with a single-stage axial flow turbine rotor 2, a plurality of combustion chambers or "combustors" 3, circumferentially spaced around the casing of compressor 1 with their discharge ends arranged to deliver hot motive fluid through suitable nozzles 4 to the buckets of the turbine rotor 2. Air enters the compressor 1 through an annular air inlet grill 5. From the discharge of compressor 1, air is distributed to the respective combustors 3 in a manner more clearly disclosed in the above-mentioned Howard Patent No. 2,479,573.

Each combustor contains a nozzle 6 which introduces fuel into the combustion space in a suitable manner, and certain of the combustors contain a suitable ignition device (not shown). The nozzles represented diagrammatically in Fig. 1 may advantageously be of the type known as a "duplex" fuel nozzle, more specifically described in an application Serial No. 622,604, filed October 16, 1945, in the names of Charles D. Fulton and David C. Ipsen now U. S. Patent No. 2,590,854 of April 1, 1952. The details of the fuel nozzle system are not material to an understanding of the present invention; but it may be noted that the duplex nozzle is especially designed to produce a satisfactory fuel spray over the extremely wide range of operating conditions encountered by aircraft gas turbine powerplants. This nozzle equires two separate supply passages, represented by the two annular headers 7 and 8 provided with branch conduits 9 and 10, respectively, to each of the nozzles 6. Fuel is supplied by a pump described hereinafter through a supply conduit 11 and a "flow divider" 12, a special type of metering valve arranged to deliver fuel at two different pressures to the headers 7 and 8, as described more specifically in the above-mentioned application of Fulton and Ipsen.

While Fig. 1 illustrates a fuel spray system incorporating a duplex type spray nozzle and flow divider, it is to be understood that the precise type of nozzle system to which the conduit 11 delivers fuel is immaterial to the present invention. Other types of fuel and fuel introducing systems may be used, provided they have the required range and other characteristics necessary to successful operation in air-craft powerplants.

The hot gases discharged from turbine 2 flow through an annular passage 15 defined between the "tail-cone" 13 and an inner conical housing 14. A suitable exhaust conduit 16 may be connected by a flanged joint at 17 to tail-cone 13, and serves to conduct the exhaust gases to an outlet (not shown) which may preferably define a nozzle designed to produce jet thrust.

The forward end of the turbine-compressor rotor is provided with a shaft extension 18 carrying a driving pinion 19. This gear meshes with a plurality of planet pinions 20 carried by a spider member 21 secured to a propeller drive shaft 22 supported in a suitable bearing 23.

Shaft 22 is arranged to drive both the variable pitch propeller 24 as well as a plurality of accessory devices supported on and driven from gearing within the accessory drive casing 25. These accessories may include an electric starter motor 26, a pressure oil pump 27, a fuel oil pump 28, and a regulator 29 arranged in accordance with our invention. A number of other accessories (not shown in Fig. 1) may be driven from the accessory drive casing 25, for instance an electric generator, tachometer generator, hydraulic power pump, etc.

The spinner housing 30 of propeller 24 contains the mechanism for adjusting the pitch of blades 31, which mechanism is under the control of a pitch adjusting lever 32. This blade adjusting mechanism 32 may be of any suitable type, the precise details thereof being unnecessary to an understanding of the present invention. It may be noted, however, that each position of lever 32 corresponds to a predetermined pitch or angle of attack of the propeller blades. It is desirable to employ a propeller pitch control mechanism capable of varying the pitch very rapidly in accordance with the control signal, the rate of change required being of the order of 20 to 30 degrees of blade pitch per second.

Associated with the planetary speed reduction gearing 19, 20 are a plurality of hydraulic cylinders 33, each connected to and arranged to resist rotation of the stationary ring gear 20a with which the plane pinions 20 mesh. One of these hydraulic cylinders is a "master cylinder," shown rotated somewhat out of the plane of the planetary gearing and to an enlarged scale at 34. This master cylinder includes a housing 35 defining a cylindrical bore in which is slidably arranged a piston 36, the piston 36 and cylinder 35 defining a pressure chamber 37. One or more ports 38 in piston 36 communicate with the pressure chamber 37 and have an opposite end portion arranged to come into alignment with a drain port 39 in cylinder 35 when the piston 36 moves to the right. Piston 36 is connected by means of a link 41 to an abutment 40 fixed to ring gear 20a.

The operation of the torque-sensing master cylinder 34 is as follows. It will be understood that the ring gear 20a of the planetary reduction gear train is arranged to "float" on suitable bearings (not shown), the reaction produced by the planetary gears being balanced by a force on the ring gear produced by hydraulic pressure in the cylinders 33, 34. This is a diagrammatic representation of a well-known arrangement for measuring the torque transmitted by a planetary reduction gear train, and more specific details are believed unnecessary to an understanding of our invention.

If the torque transmitted by the gearing to propeller shaft 22 should decrease, then the hydraulic pressure in chamber 37 will cause piston 36 to move to the right so as to align the ports 39 with passages 38 and permit some of the liquid in the cylinder to drain off, until the pressure in chamber 37 falls to a value just sufficient to provide the force needed to balance the reaction on ring gear 20a produced by the planetary gearing. Conversely if the torque should increase, then piston 36 would move to the left closing off drain ports 39 until the oil pressure again builds up in chamber 37 so that the force produced on piston 36 balances the increased torque. Thus, it will be seen that the hydraulic pressure in chamber 37 may be taken as a measure of the torque transmitted from the turbine-compressor shaft 18 to the propeller shaft 22.

Supported on tail-cone 13 is a temperature responsive device 42. The details of this thermal device are described more in detail in our previously filed application Serial No. 605,960 now Patent No. 2,622,393. It may be stated briefly that the device consists of an outer tube 43 made of a suitable temperature resisting metal and an inner rod 44 made of a non-expanding material such as quartz. The quartz rod 44 extends into a housing 45 through a bellows seal and engages a cantilever spring 46. One end of the spring engages the end of an adjusting screw 47, while the other end engages a slidable plunger 48 supported by housing 45 in cooperative relation with an oil bleed port 49. Oil entering housing 45 through the port 49 is drained therefrom through a port 50 and a suitable drain conduit. While only one thermal device 42 is shown, it will be understood by those skilled in the art that two or more similar devices, connected in parallel and spaced around the circumference of tail-cone 13, may be used to obtain an average indication of the temperature of the turbine discharge gases.

The fuel pump 28 may be of any suitable type having a variable displacement which is varied in accordance with a signal supplied to an automatic control device incorporated in the pump. The pump and its integral displacement control device may advantageously be of the type represented in our previous application Serial No. 605,960 now Patent No. 2,622,393. The precise mechanical details of the pump used are not material to an understanding of the present invention; it is necessary only to observe that pump 28 delivers fuel to conduit 11 at a variable pressure in accordance with a control signal, such as a hydraulic pressure supplied to it through conduit 63.

The pressure oil pump 27 constitutes a separate source of oil for actuating the torque measuring system. Pump 27 may be of any suitable positive displacement type, and is geared directly at a fixed ratio to the propeller shaft 22 by means of the gearing contained in the accessory drive casing 25.

The regulator 29 will be described more particularly in connection with Fig. 2, but it may be noted here that it is provided with a single manually controlled shaft 51 arranged to be positioned by means of a lever 52 connected by means of a link 53 to a throttle lever 54, which is shown in Fig. 1 in its "off" position. Lever 52 is also connected by means of a link 55 to the operating lever 56 of a shut-off valve or "stopcock" 57, which may be of the type disclosed in an application Serial No. 630,673, filed November 24, 1945 in the name of S. R. Barr, now U. S. Patent No. 2,485,349 of October 18, 1949.

The piping connecting the various components mentioned above is arranged as follows. Fuel from a suitable reservoir 58 is conducted by a pipe 59 to fuel pump 28 and is discharged through stopcock 57 to conduit 11 which supplies the fuel nozzle system, including the flow divider 12 and the spray nozzles 6. As noted above, the discharge pressure of fuel pump 28 is automatically varied in accordance with a control oil pressure communicated to it from regulator 29 through conduit 63.

The pressure oil pump 27 receives oil from a storage sump or tank (not shown) and delivers it to the hydraulic torque cylinders 33, 34 through conduit 61. Branching off from conduit 61 is a conduit 62 which communicates the pressure in the torque-sensing chamber 37 to the regulator 29.

The static pressure at the inlet 5 of compressor 1 is communicated to the regulator 29 by a conduit 64 and the compressor discharge pressure is communicated from the outlet of the compressor 1 to regulator 29 through conduit 65. The thermal element 42 is connected to regulator 29 by means of a supply conduit 66 and a return pipe 67. A propeller pitch control shaft 68b projecting from the housing of regulator 29 is connected by suitable means, for instance a lever 68 and link 32a, to actuate the pitch control lever 32.

Regulator

The mechanism contained within the regulator 29 is represented schematically in Fig. 2 of the drawings. The regulator includes a control oil pressure pump 69 supplying liquid to a fuel pressure control motor 70, a speed responsive control motor 71, a temperature control motor 73, a propeller pitch control motor 74, a compensating motor 72, and a manual control shaft 51 which carries a number of cams, one for controlling the fuel pressure directly, one for adjusting the torque control means, and another for adjusting the speed governor.

Because of the absolute reliability required of such a regulator, it is necessary to take special precautions so that friction in the various hydraulic motors and pilot valves will not introduce disturbing forces into the system. To this end, the various slidable elements are arranged so that they, or the bushings in which they slide, can be rotated by suitable gearing connected to the regulator drive shaft 80. It will be seen from Fig. 2 that gear 81 on shaft 80 is arranged to drive gear 82, while a second gear 83 on shaft 80 drives gear 84. Mounted on the shaft of gear 84 is a second gear 85 arranged to drive gears 86 and 87. Gear 88 is arranged to rotate with gear 87 and in turn drives gears 89, 90, 91, 92, and 93. It will be observed that gear 81 is comparatively wide with respect to gear 82, so that the latter can reciprocate vertically and still remain in engagement with gear 81. Likewise gears 92 and 93 are made sufficiently wide so that they can reciprocate while remaining in driving engagement with gear 91.

It should be noted that the schematic layout shown in Fig. 2 represents a "developed" view of the apparatus. In building an actual regulator, this developed layout would be "rolled up" so that all the components shown are arranged compactly within a cylindrical space, the various elements being so located relative to each other that the gear 82 will mesh directly with gear 81, gear 83 with gear 84, 87 with 85, 88 with 89, and 91 with 93. With this arrangement, all of the reciprocating elements subject to friction forces which might produce erratic action of the governor are provided with continuous relative rotational movement so that static friction effects are eliminated.

The construction and arrangement of the various components of the regulator 29 will now be described in more detail.

Fuel pressure control

Fig. 2 represents the components comprising the regulator 29 in the condition corresponding to the "shut down" or "off" position of throttle 54.

Oil for actuating the various components is drawn from a suitable reservoir (not shown) by the positive displacement pump 69 incorporated in the regulator 29 and arranged to be driven from shaft 80 by means of the gearing in the accessory drive casing 25. It will be obvious that pump 69 may be of any suitable type, although a simple gear type has been shown in the drawing. The pump 69 delivers oil into a main header 101 which is provided with a pressure relief valve 102 arranged to maintain substantially constant the pressure in the header.

The primary control of the fuel pressure delivered by pump 28 is effected by means of the fuel pressure control motor 70, which consists of a piston 103 slidably arranged in a cylinder so as to define a control oil pressure chamber 104. Chamber 104 communicates by way of conduit 105 with the automatic pressure responsive control device incorporated in fuel pump 28. As indicated above, the automatic variable displacement pump 28 is so arranged that an increase in the control pressure supplied through conduit 105 results in a proportional increase in the pressure of the fuel supplied to conduit 11 and the spray nozzle system.

The control oil pressure in chamber 104 is established by means of a fuel pressure control pilot 106, which is slidably arranged in the rotating bushing 107 carrying gear 89. Bushing 107 is provided with a first annular groove 109 adapted to receive oil under pressure from header 101 through conduit 108. One or more ports communicate between the annular groove 109 and the bore 110 through bushing 107. A second annular groove 111 in bushing 107 is arranged to communicate with conduit 105, and a second set of ports communicate between groove 111 and the bore 110.

As will be apparent from Fig. 2, the pilot 106 is provided with a portion of reduced diameter 112 defining an annular passage with the bore 110. The lower end of pilot 106 forms a cylinder which closes off the ports communicating with groove 109 when the pilot 106 rises.

Piston 103 of the fuel pressure control motor 70 operatively engages the end of a piston rod 113. A fuel pressure control lever 114 is pivoted to piston rod 113 and to the pilot 106 in a manner which will be apparent from Fig. 2. Pilot 106 is shown in its lower-most position with free communication provided from header 101 through conduit 108, groove 109, through the passage defined by pilot portion 112 to the upper set of ports and groove 111, thence to conduit 105 and the control oil pressure chamber 104. When the powerplant starts, oil is supplied from pump 69 by way of these passages so as to build up a pressure in chamber 104 and a corresponding pressure in the control device of fuel pump 28. This pressure in chamber 104 will cause piston 103 to rise, and pilot 106 will also rise by means of the follow-up connection provided by lever 114. When pilot 106 blanks off the ports communicating with groove 109, the flow of oil from header 101 to the pressure chamber 104 will cease. It will be understood by those skilled in the art pertaining to hydraulic servo-devices that in order to have pilot 106 freely slidable in bushing 107 a comparatively free fit is required, and that there will inevitably be a small amount of leakage through the respective clearances between pilot 106, bushing 107, and the cylinder in which bushing 107 rotates. There will likewise be some leakage in the hydraulic control device incorporated in fuel pump 28. Therefore, as soon as the supply of oil from header 101 to chamber 104 ceases, this leakage results in a decreasing pressure in chamber 104 so that piston 103 tends to descend. Such movement of course causes pilot 106 to move downwardly and again provide communication by way of groove 109 so that oil from header 101 can flow to the pressure chamber 104 and restore the pressure therein to its previous value. In operation, the pilot 106 is positioned by lever 114 to meter the flow of oil from header 101 to chamber 104 at such a rate that a specific pressure is maintained therein, corresponding to the position of lever 114.

The control oil pressure in chamber 104 produces an upward force on piston 103 which is balanced by a main biasing spring 115. This spring acts on the upper end of piston rod 113 through a variable ratio lever system consisting of a first lever 116 supported on a fixed pivot 117 and a second lever 118 substantially parallel to lever 116 and supported on a fixed pivot 119 adjacent the free end of lever 116. Roller 120 is arranged to transmit force from lever 116 to lever 118 and is adjustable in a direction substantially parallel to levers 116, 118 by a mechanism and for a reason described hereinafter. This general arrangement is referred to as a "nutcracker linkage" and is somewhat similar to the arrangement used in our above-mentioned Patent No. 2,622,393. It will be apparent by analysis of Fig. 2 that if roller 120 is moved to the right, then the force exerted by spring 115 will produce a reduced reaction between lever 116 and roller 120, and a likewise reduced reaction between roller 120 and lever 118. Because of the shift of roller 120 to the right, the reaction force lever 118 imposed on piston rod 113 is still further reduced. Conversely it will be apparent that as roller 120 moves to the left, the reaction between lever 116 and roller 120 increases. Also the force exerted on piston rod 113 approaches closer to the value of the reaction force between roller 120 and lever 118. The roller 120 is arranged to be positioned by the compensating motor 72, as described hereinafter.

The pressure control lever 114 is provided with an adjustable stop 121 biased into engagement with a vertically reciprocable rod 122 by means of a tension spring 123. The lower end of rod 122 is engaged by a contoured fuel pressure control cam 124 carried by the manual control shaft 51. As indicated above, the piston 103 is shown in its lowermost position, while cam follower 122 is in its uppermost position corresponding to the "minimum pressure" position of cam 124. When the powerplant starts, piston 103 and pilot 106 move upwards, lever 114 pivoting about the adjustable abutment 121 until the position of piston 103 pilot 106, and the pressure in chamber 104 reach a steady state condition corresponding to the minimum pressure position of cam 124. When cam 124 rotates clockwise from its minimum pressure position, rod 122 is permitted to move downwardly under the biasing effect of the spring 123, and lever 114 pivots clockwise about its connection with piston rod 113, so that pilot 106 is lowered to a position resulting in the admission of control oil from header 101 to chamber 104 at a greater rate, with the result that the pressure maintained in chamber 104 is increased.

It will be seen that in the absence of the other control devices described hereinafter, progressive clockwise rotation of the pressure control cam 124 would produce a continuously increasing pressure in chamber 104. The relation between the position of the cam 124 (i. e. the position of throttle 54) and the pressure maintained in chamber 104 can of course be made to vary according to any desired schedule by properly selecting the contour of cam 124. Thus it will be apparent that any desired relation between fuel rate and throttle position can be obtained.

*Speed responsive control*

The speed governing function of our regulating system is performed by the governor 71. This comprises an extension 80a of the driven shaft 80, which extension carries the gears 81, 83. Shaft extension 80a is rotatably arranged in a central bore through a bushing 126 arranged to be rotated by means of the gear 87. At its upper end, bushing 126 carries a pair of pivoted flyweights 125 arranged to position a rotatable bushing 127 relative to the slidable but non-rotatable speed control pilot 128. Bushing 127 is caused to rotate by reason of the engagement of flyweights 125 with suitable sockets or grooves in its lower end portion. It is provided with an upper port aligned with an annular groove 129 in the wall of the cylinder in which bushing 127 slides and rotates. Likewise a lower port in bushing 127 communicates with annular groove 130.

The upper end of bushing 127 carries a suitable anti-friction bearing 131 which in turn supports a non-rotatable yoke 132. Seated on the cylindrical upper end of the housing 132 is a conical biasing spring 133 having at its upper end a button 133a engaged by bifurcated abutment 134 formed on one end of a pivoted lever 135. End portion 136 of lever 135 is arranged to be positioned by an actuating rod 137, the extreme position being determined by an adjustable stop 138. Rod 137 is provided with a spring-biased telescopic slip joint 139, so arranged that the two rod portions 137a and 137b are normally maintained in the relative position shown in Fig. 2. After rod 137 is in its uppermost position with lever end portion 136 engaging the stop 138, the slip joint 139 permits the lower portion 137b to move upwardly an additional increment, for a purpose noted hereinafter. The lower end of rod 137 is biased by the force of spring 133, into engagement with a speed recalibrating cam 140 carried on the manual control shaft 51.

The slidable but non-rotatable speed control pilot 128 is provided with an upper yoke portion 128a through which projects a pivoted follow-up lever 141. A coil spring 142 concentrically arranged within spring 133 engages a fixed stop 143 which is freely slidable in lever end portion 134 and button 133a and adjustable by means of its threaded engagement with the fixed support, as shown in Fig. 2. It will be understood that end portion 134 of lever 135 is bifurcated, with portions engaging cap 133a on either side of the stop screw 143. Spring 142 engages the yoked end portion 128a of the speed control pilot 128 so as to provide a yielding engagement between follow-up lever 141 and the pilot 128.

The speed control pilot 128 is arranged to supply oil under pressure from header 101 by way of conduit 144; groove 129, the upper port in bushing 127, past the reduced central portion of pilot 128, and through the lower port in bushing 127, groove 130 and conduit 145 to the end surface of a speed control piston 146 slidably arranged in a cylinder having an upper end closed by a cap 147 and containing a coil spring 148 arranged to bias the piston 146 to its lowermost position, shown in Fig. 2. Connected to piston 146 is a rod 149 provided with axially spaced abutments 150, 151 and 152. The upper end of rod 149 is engaged by the free end of follow-up lever 141, under the influence of spring 142.

The abutment 150 on piston rod 149 is arranged to engage a bifurcated portion 153 at the extreme end of fuel pressure control lever 114. Likewise, abutment 152 is adapted to engage the end portion of a torque control lever 154, the function of which will be noted hereinafter.

In operation, no control oil is supplied to the speed control piston 146 as long as pilot 128 remains aligned with the lower port in bushing 127 as shown in Fig. 2; and bushing 127 will remain so aligned as long as the speed of flyweights 125 corresponds to the speed setting established by the position of pilot 128, as set through the lever 135, rod 137, and speed recalibrating cam 140. If the rotational speed should rise above this established value, then flyweights 125 move outwardly, causing bushing 127 to rise and establish communication from groove 130 through the lower port in bushing 127 to the groove 129 and conduit 144. Control oil then flows from the header 101 past the pilot 128 to the speed control piston 146 causing it to rise until follow-up lever 141 restores pilot 128 to the aligned position. Thus it will be seen that the speed control piston 146 moves upwardly in accordance with corresponding motion of the pilot 128. However, because the abutment 150 on piston rod 149 is somewhat spaced from the end portion 153 of fuel pressure control lever 114, such an increase in speed will not have an immediate effect on the fuel pressure. When the speed increases a preselected amount, as determined by the clearance between abutment 150 and lever end portion 153, then any further increase in speed will cause lever 114 to pivot counterclockwise about its connection to the fuel pressure control piston rod 113. This causes the fuel pressure control pilot 106 to rise, reduces the pressure in chamber 104, and thereby decreases the fuel pressure produced by pump 28, as described above. Decrease in the supply of fuel to the combustors will of course produce a decrease in speed which permits flyweights 125 to move inwardly and bushing 127 to descend so that oil is bled through conduit 145, groove 130, the lower port in bushing 127, and out through the open bottom end of the bore in bushing 127. The resulting decrease in pressure acting on speed control piston 146 causes it to descend under the influence of biasing spring 148 so that lever 114 moves downwardly until the adjustable stop 121 again engages cam follower 122. This action of the speed governor in reducing the supply of fuel to the combustors takes place irrespective of the position of control cam 124 and the actuating rod 122. Thus the speed governor 71 prevents over-speed conditions regardless of the fuel pressure called for by the control cam 124.

It will also be noted that when the rotational speed is sufficiently high, as established by clockwise rotation of the speed setting cam 140, the fuel pressure control lever 114 will float free of the actuating rod 122 and will be positioned by reason of the engagement between end portion 153 and the abutment 150 on the speed control piston rod 149. When operating in this manner, any decrease in speed below the established value will result in a lowering of bushing 127 by flyweights 125 and bleeding of oil through conduit 145 to cause a corresponding descent of speed control piston 146 as described above. The rotating bushing 126 is provided with an upper port 155 and a lower port 156. The shaft 80a is provided with an axially extending groove or flat portion 157 of sufficient length to communicate with ports 155 and 156 during a certain portion of each revolution. Since both shaft 80a and bushing 126 are rotating, the average percentage of the time during which the groove 157 is in communication with the two ports will depend on the geometry of the parts and the relative speed of rotation between shaft and bushing. This arrangement comprises a rotary flow restrictor which serves a purpose noted hereinafter.

*Temperature responsive control*

Excessive temperatures in the powerplant are prevented by means of the temperature responsive device 42 which furnishes a signal to a temperature control motor 73. Motor 73 comprises a rotatable piston 73a arranged to reciprocate vertically in a cylinder defining a temperature control pressure chamber 73b. Control oil is supplied from header 101 through conduit 158 to a port 159 which is blanked off by piston 73a during a portion of each revolution. An axial groove or flat portion 160 formed on piston 73a provides communication during a certain percentage of each revolution between the port 159 and the temperature control pressure chamber 73b. Thus piston 73a with its groove 160 forms another rotary flow restrictor, so that oil pressure can be applied to the end of piston 73a at only a limited rate of increase. It will also be seen from Fig. 2, that piston 73a forms a rotary flow restrictor for a second port 161 communicating with a conduit 162, which also leads to the supply header 101 by way of conduit 144 and a shut-off valve 163 associated with the lower end portion 137b of the speed control rod 137. This shut-off valve comprises a rod portion of reduced diameter 163a which is brought into alignment with conduit 162 so as to permit flow therethrough only under certain special conditions described hereinafter.

Communicating with the temperature control pressure chamber 73b is the conduit 66 which is connected to the inlet port 49 of thermal device 42. During operation, oil is supplied from header 101 through conduit 158 past the rotary flow restrictor 159, 160 to chamber 73b, and thence through conduit 66 to thermal device 42. As long as the temperature of the turbine exhaust gases are within the allowable safe limits, plunger 48 of thermal device 42 will remain in position to block the flow of oil from port 49. Therefore, a pressure is built up in chmaber 73b which holds the temperature control piston 73a down against the bias of spring 165. If, however, the temperature should rise, differential expansion between the metal tube 43 and quartz rod 44 of thermal element 42 will cause the cantilever spring 46 to relax, thus permitting plunger 48 to move away from port 49 so that oil may be discharged therefrom and the pressure in chamber 73b reduced. This results in upward movement of piston 73a under the influence of biasing spring 165, and if this upward movement continues far enough the temperature piston may take over control as follows.

It will be seen from Fig. 2 that a rod 166 connected to piston 73a is provided with an end portion engaging one arm of a pivoted lever 167, which has a second arm arranged to exert a downward force on torque control lever 154. An intermediate portion of rod 166 forms an annular shoulder 168 which is arranged to engage an abutment 169 fixed to the actuating rod 122. It will be apparent that if temperature control piston 73a moves upwardly far enough, the shoulder 168 will engage abutment 169 and cause rod 122 to move the fuel pressure control lever 114 in a counterclockwise direction to reduce the fuel pressure so as to reduce the fuel supply pressure. It will be noted that the clearance between shoulder 168 and abutment 169 will vary as a function of the position of cam 124. Thus the temperature at which the temperature control motor 73 takes over is a function of the fuel pressure called for by the manual control through cam 124. The effect of the temperature control piston 73a on the torque control lever 154 will be noted hereinafter.

*Torque responsive control*

The arrangement for controlling the propeller shaft torque will now be described. As noted above, regulator shaft 68b is connected to the propeller pitch control lever 32, the arrangement being such that clockwise rotation of shaft 68b produces an increase in the angle of pitch of propeller blades 31, which results in an increase in propeller shaft torque. Shaft 68b carries a gear sector 68a having teeth which project into the cylinder of pitch control motor 74 and engage rack teeth formed in the outer surface of piston 74a.

The pitch control piston 74a is arranged to be positioned by control oil admitted to end pressure chambers 74b and 74c, respectively, by means of pitch control pilot 170. The lower end of pilot 170 is arranged to be subjected to the pressure of the oil in the torque-sensing cylinder 34, being placed in communication therewith by conduit 62. The force exerted on pilot 170 by the oil pressure communicated by conduit 62 is balanced by a force exerted by a spring 171 through a lever 172 having an end portion engaging the upper end of a vertically slidable rod 173 with a lower end portion 174 engaging freely the upper end of the rotating and sliding pilot 170. An adjustable roller 175 forms a variable fulcrum arranged to be positioned by the compensating mechanism described hereinafter.

The reaction force between roller 175 and lever 172 may be varied by means of a pivoted lever 176 which engages roller 175 on the side opposite from lever 172 and is arranged to be positioned by means of a gear meshing with a reciprocable rack 177 connected to a slidable torque setting rod 178. Rod 178 has an end portion arranged to be engaged by a torque setting cam 179 secured to the manual control shaft 51. It will be apparent from Fig. 2 that if control shaft 51 rotates far enough in a clockwise direction it will cause rod 178 to move upwardly with the result that lever 176 will move counterclockwise, causing fulcrum 175 and lever 172 to move downwardly and further compress spring 171. Compression of spring 171 of course increases the spring force on lever 172, thereby increasing the reaction force imposed by lever 172 on the upper end of rod 173. The increased force on rod 173 will first tend to move pilot 170 downwardly from its aligned position with the ports leading to conduits 182, 183 so that control oil is supplied from header 101 through conduit 180 to the chamber 181 formed by the reduced diameter portion of pilot 170, thence through conduit 182 to the upper end chamber 74b of the pitch control motor. Meanwhile downward movement of pilot 170 has opened communication between the lower end chamber 74c through conduit 183 and out past the pilot 170 by way of an axial groove 183 formed in the wall of the cylinder in which pilot 170 slides. The increased pressure in the upper end chamber 74b combined with the reduced pressure in chamber 74c causes the pitch control piston 74a to move downwardly and rotate gear sector 68a counterclockwise to call for increased propeller pitch. As noted before, increased pitch means increased propeller shaft torque when the speed governor 71 holds the rotational speed constant.

In the event that the propeller shaft torque increases above the value for which the regulator is set, the pressure communicated through conduit 62 to the lower end of pilot 170 will increase, with the result that the pilot moves upwardly to admit control oil from header 101 to conduit 183 and the lower end chamber 74c of the pitch control motor. Simultaneously oil is bled from the upper end chamber 74b through conduit 182 and out through a drain port 184. Pitch control piston 74a thereupon moves upwardly to rotate shaft 68b clockwise so as to call for decreased propeller pitch and therefore decreased torque. A light spring 181b, just stiff enough to overcome the weight and friction of the moving parts, is arranged to bias the pilot 170 to its uppermost position, shown in Fig. 2, when the powerplant is inoperative.

Connected to pitch control piston 74a is a follow-up rod 74d freely slidable through the upper end of the pitch control motor cylinder, and having an end portion 74e. A spring 171a arranged between the end portion 74e and the lever 172, as shown, introduces a "feedback force" in the torque governing mechanism which has been found to produce a desirable stabilizing effect.

The torque modifying lever 154 changes the operation of the propeller torque control mechanism as follows. Lever 154 is supported on a fixed pivot 154a and has at its right-hand end a yoke portion 154b arranged to be engaged by the abutment 152 on rod 149. At its left-hand end, it has a second bifurcated yoke portion 154c arranged to engage an abutment member or bushing 185 which is freely slidable on rod 173 and has a lower-most position defined by a fixed stop 186. A coil spring 187 is arranged around rod 173 and engages the upper surface of bushing 185 and the lower surface of lever 172. With this arrangement, clockwise movement of the torque modifying lever 154 will produce upward movement of abutment 185 so as to compress spring 187 and produce an upward force on the left-hand end of lever 172. Such upward force reduces the reaction imposed downwardly on the rod 173 by the biasing spring 171 and lever 172. Thus it will be seen that clockwise rotation of lever 154 will "unload" or reduce the downward force imposed on rod 173, and thus reduce the propeller shaft torque setting.

The pitch control motor 74 is arranged to hold constant the propeller shaft torque at a value determined by the manually controlled cam 179, as modified by the compensating arrangement through which roller 175 is positioned, and the overriding devices acting on the torque governor through the modifying lever 154.

*Compensating mechanism*

As in the regulating system disclosed in our U. S. Patent 2,622,393, means are provided for automatically modifying the action of the regulator so that the full load rating varies in a predetermined manner as a function of the altitude or inlet conditions, the fuel supply rate being less for full load operation at high altitudes than at sea level. The compensating mechanism is also arranged so that any given position of the operator's throttle 54 corresponds at each altitude to a predetermined percentage of the full load rating permissible at that altitude. This contributes to the pilot's ease of operating the powerplant for he knows that, for instance, the "three-quarters throttle" position will produce 75 per cent of full rated load, regardless of changes in inlet conditions and the fact that the permissible full load rating varies as a function of altitude. In the present regulator, the compensating mechanism also incorporates means for recalibrating the torque control mechanism so that the torque setting called for by cam 179 is automatically modified as a function of altitude and other pressure conditions associated with the operation of the powerplant.

The compensating motor 72, which is arranged to position the variable fulcrums 129 and 175 is energized by control oil from header 101 directed by the compensating pilot 190, as positioned by a pair of pressure responsive bellows 191 and 192. Bellows 191 has an upper end fixed by suitable means to a support 193 and a movable head 194 with a rod 195 pivoted to a lever 196. Inside bellows 191 is a tension spring 197 connected to a hook secured in the movable head 194 and an adjustable rod 198 secured in the fixed end member 199. It will be apparent from Fig. 2 that the tension of spring 197 may be adjusted by removing the cover 200 and rotating the adjusting nut 201. The pressure obtaining in the outlet 1a of compressor 1 is communicated to the interior of bellows 191 by a conduit 65. Bellows 192 is connected to lever 196 in opposition to the bellows 191 and has its interior communicating with the pressure existing at the inlet 5 of compressor 1 by means of conduit 64.

Because the compressor inlet pressure varies as a function of altitude, this bellows arrangement will be responsive to changes in altitude. Furthermore, since the compressor discharge pressure is a function of compressor inlet temperature, and also a function of compressor efficiency, the bellows arrangement will be responsive to these factors.

As will be apparent from Fig. 2, the lever 196 is pivotally connected to the compensating pilot 190 and to the piston rod 72b associated with the piston 72a of the compensating motor. In operation, control oil is supplied from header 101 through conduit 202, through an annular groove in the rotating bushing 203 to one or more ports 204 which are blocked by disk 205 of pilot 190 when the compensating mechanism is in a steady state condition. In the event of a change of conditions resulting in an upward movement of rod 195, for instance a decrease in compressor discharge pressure (for instance that resulting from an increase in altitude) lever 196 will pivot clockwise about its connection with piston rod 72b, causing pilot 190 to rise, so that oil is admitted from conduit 101 through conduit 202 and port 204 to the lower side of pilot disk 205, thence through ports 206 to conduit 207 and the chamber of compensating motor 72 on the lower side of piston 72a. The resulting increase in pressure causes piston 72a to move upwardly until pilot 190 is restored to its neutral position by means of the follow-up connection provided by the lever 196. Liquid contained in the chamber above piston 72a passes directly through conduit 208 to the pilot 190 past the check valve 209, and out drain port 212a and vent 212b.

Conversely when increasing compressor discharge pressure causes the rod 195 to move downwardly, pilot 190 descends so that oil is conducted through conduit 202 and port 204 to the upper side of pilot disk 205. Because of the check valve 209, it must pass to the upper side of piston 72a by way of the conduit 211, the rotary flow restrictor formed by the parts 155, 156 in bushing 126 and the axial groove in shaft 80a, thence through conduit 210. Increase in pressure on the upper side of piston 72a causes it to move downwardly until pilot 190 is restored to its neutral position, liquid from the lower end chamber of motor 72 draining through conduit 207 directly to the port 206 and out by way of drain port 206a and vent 206b.

With this arrangement it will be seen that when compressor pressure rise decreases, pilot 190 moves upward to cause control oil to be supplied to the lower surface of piston 72a, the piston responding promptly. On the other hand, with increasing compressor pressure rise pilot 190 moves downwardly to admit fluid to the upper side of piston 72a at a limited rate past the rotary flow restrictor 155, 156, 157.

Upward movement of piston rod 72b causes a cam follower roller 213 carried on a pivoted link 214 to be positioned along a stationary cam member 215. A second roller 216 is carried by a member 217 pivoted to link 214 and biased into engagement with the opposite side of cam member 215 by means of a spring 218. The function of the spring-biased roller 216 is merely to maintain the cam follower 213 in engagement with the cam member 215. The previously mentioned roller 120 is carried by a link 219 pivoted to link 214 at the axis of cam follower 213. It will be apparent from Fig. 2 that upward movement of piston rod 72b will cause link 214 to move upwardly and clockwise as roller 213 follows the surface of cam 215. Roller 120 is thus caused to move to the right so as to reduce the reaction force exerted by spring 115 on rod 113. While Fig. 2 shows the cam member 215 as having a straight upper surface inclined at about 45 degrees to the horizontal, it will be obvious that member 215 may be inclined at other angles and may have a curved rather than a straight surface so as to position roller 120 according to any desired schedule as a function of the vertical movement of rod 72b. Thus the compensating effect produced on the fuel pressure control piston 103 can be made to vary in any desired manner.

Piston rod 72b is also provided with a laterally extending portion 72c to which is pivoted a link 220 which carries a roller 221 arranged to follow the surface of a cam member 222. A roller 223 is carried by an arm 224 pivoted to link 220 and biased by a spring 225 into engagement with the under side of cam member 222. The adjustable roller 175 is connected by means of link 226 to the link 220, so that vertical movement of member 72c serves to position the roller 175. Cam member 222 may also incline at various angles or have various curved shapes so as to produce any desired movement of the roller 175 as a function of the movement of the compensating piston 72a.

By appropriate shaping of cams 215 and 222, the compensating mechanism can be arranged to produce a preselected percentage of rated power output for each position of the throttle, irrespective of changes in inlet conditions, altitude, compressor efficiency, etc.

*Operation*

As indicated above, Fig. 2 represents the regulator 29 when in the "off" or shut-down condition. To start the powerplant, the starter motor 26 is energized so as to cause the powerplant rotor and the propeller to turn. In order to decrease the starting torque required of motor 26, it is desirable that the propeller blades 31 be positioned to the zero angle of attack. To effect this, when cam 179 returns to the "noload" position biasing spring 181b will cause the pitch control pilot 170 to move to its uppermost position, shown in Fig. 2, causing the pitch control piston 74a to rise to the "zero pitch" position.

After the starter motor has brought the powerplant rotor up to a speed of approximately 10 per cent of its rated speed, the throttle handle 54 may be moved forward from the "off" position to rotate the manual control shaft 51 clockwise. During about the first five degrees of such rotation, the link 55 (Fig. 1) causes the shut-off valve 57 to open. Meanwhile, rotation of the compressor-turbine rotor has caused the pump 69 in regulator 29 to supply control oil under pressure to the conduit 101 and thence to the various components of the regulator. Control oil will flow through conduit 180 to the pitch control pilot 170, through conduit 183 to the lower chamber 74c so as to bias the pitch control piston 74a to its uppermost position, corresponding to the zero pitch position of the propeller. Thus the regulator assures that the propeller will be in the zero pitch or minimum torque position during the starting cycle.

Likewise control oil will flow through conduit 108 to the ports 109 of the fuel pressure control pilot 106, thence through conduit 105 to the control device of fuel pump 28 and to chamber 104 of the fuel pressure control motor 70. The pressure in chamber 104 causes piston 103 to rise slightly from the lowermost position shown in Fig. 2, so as to float free of the shoulder which defines its lowermost position. This slight upward movement of piston 103 causes the fuel pressure control lever 114 to rotate clockwise about the stop 121, thereby raising the fuel pressure control pilot 106 so as to shut off the flow of control oil through port 109. Actually, the pilot 106 will take such a position as to permit a limited rate of flow through port 109 to conduit 105 so as to maintain a constant pressure in the chamber 104, this minimum pressure corresponding to the zero discharge condition of the fuel pump 28.

If now, the manual control shaft 51 is caused to rotate still further in a clockwise direction, the fuel pressure control cam 124 will permit the cam follower 122 to move downwardly under the influence of biasing spring 123, which also serves to move the fuel pressure control lever 114 clockwise about its pivotal connection with the rod 113. Such movement of lever 114 causes pilot 106 to descend so as to increase the flow of oil through port 109 to conduit 105 and the chamber 104. The resulting increased pressure in chamber 104 causes the piston 103 of the fuel pressure control motor 70 to rise, and to simultaneously cause the pump 28 to produce an increased discharge pressure. When the fuel pressure in the nozzle supply line 11 rises to the proper value, of the order of 40 pounds per square inch, the ignition devices (not shown) initiate combustion in the combustors 3.

If the manual control shaft 51 moves still further clockwise, the fuel pressure control cam 124 permits cam follower 122 to descend still further, thus actuating the fuel pressure control pilot 106 to increase still further the pressure in the chamber 104 and the control device of pump 28. Thus rotation of cam 124 causes a progressive increase in the pressure of the fuel supply to conduit 11, with the result that the rotational speed of the powerplant increases correspondingly. During this increase in speed, the flyweights 125 of the centrifugal speed governor 71 move progressively outward and raise the bushing 127 so as to admit control oil from conduit 144 through port 129, thence through port 130 to conduit 145 and the lower surface of the speed control piston 146. This hydraulic pressure on piston 146 causes it to progressively rise as the rotational speed of the powerplant increases, until at the speed of about 60 per cent of the rated speed the abutment 150 on piston rod 149 just engages the bifurcated end 153 of the fuel pressure control lever 114. With any further increase in rotational speed, piston 146 will move lever 114 upwardly so that the stop 121 is lifted free of the cam follower 122. Thus at about 60 per cent of rated speed, the speed governor 71 takes over the control of the fuel pressure from the manual pressure setting cam 124.

From this point on, the rotational speed is further increased by recalibrating the speed governor 71, as follows. Clockwise rotation of the speed recalibrating cam 140 causes the cam follower rod 137 to rise, rotating lever 135 counterclockwise and compressing the conical spring 133. The increased downward force causes bushing 127 to descend so that control oil is drained through conduit 145 and the pressure on the speed control piston 146 decreases, causing the piston to descend and fuel pressure control lever 114 to drop so as to lower pilot 106, increase the flow of control oil from conduit 108 to conduit 105 and thereby increase the discharge pressure of pump 28. This increased fuel supply pressure results in increased rotational speed of the powerplant rotor. Thus as the speed control cam 140 rotates clockwise, the fuel supply to the combustors progressively increases, with a corresponding increase in rotor speed to the rated value.

It may be noted that the shape of the fuel pressure control cam 124 is so selected that during control of lever 114 by the speed governor 71 there is maintained a predetermined clearance space between the surface of cam 124 and the end of cam follower 122. The presence of the cam follower 122 restricts movement of lever 114 downwardly in the event an abnormally large transient speed condition should cause the governor 71 to call for a sudden downward movement of lever 114. Thus when speed governor 71 is in control, the cam 124 and follower 122 constitute an automatically adjustable stop for limiting to a preselected displacement any sudden movement of lever 114 in the "increase fuel" direction. The amount of such sudden displacement which will be permitted may of course be varied by adjusting the screw 121. This arrangement produces a stabilizing action on the speed governing means, preventing sudden large increases in the fuel supply with resultant excessive rise in temperature.

Throughout this starting cycle, corresponding to total clockwise rotation of shaft 51 of about 40 degrees, the propeller blades 31 are at zero pitch and the powerplant is producing no useful shaft horsepower. If now shaft 51 rotates clockwise still further, cam 179 begins to move follower 178 upwardly, causing lever 176 to rotate counterclockwise and depress roller 175 and lever 172, thus compressing springs 171, 171a, and producing a downward force on rod 173. This causes the pitch control pilot 170 to descend against the bias of spring 181b, until control oil from conduit 180 is admitted through conduit 182 to the upper chamber 74b of pitch control motor 74, causing piston 74a to descend and rotate shaft 68 counterclockwise so as to give the propeller blades a positive angle of attack. The load thus applied to the propeller drive shaft 22 produces a reaction on the planetary gearing 19, 20, 21 with the result that the hydraulic pressure in chamber 37 of the torque sensing cylinder 34 is increased. This increased pressure, communicated through conduit 62 to the lower end of the pitch control pilot 170 causes the pilot to rise so as to decrease the flow of control oil from conduit 180 to the upper chamber 74b of the pitch control motor 74. Thus it will be seen that clockwise rotation of the torque control cam 179 produces a downward movement of the pitch control pilot 170, the pilot being restored by the resulting increased pressure signal produced by the torque sensing cylinder 34. Spring 171a is permitted to extend, by the downward movement of piston 74a, thus introducing a restoring action by decreasing the force on lever 172, decreasing the downward force on pilot 170, and thereby tending to reduce the torque called for.

If propeller shaft torque should increase, the pressure signal communicated through conduit 62 to the lower end of pitch control pilot 170 will likewise increase, with the result that the pilot will rise, admit control oil to the lower chamber 74c of the pitch control motor, thereby producing a decrease in the propeller pitch with a consequent decrease in torque to the value corresponding to the position of the torque setting cam 179. Similarly a decrease in propeller shaft torque would result in a decrease of pressure in conduit 62, causing pilot 170 to descend and control oil to be admitted to chamber 74b so as to move piston 74a downwardly in the "increase pitch" direction.

Thus it will be seen that the regulator maintains the propeller shaft torque constant at a preselected value determined by the angular position and contour of the torque-setting cam 179. Meanwhile, the speed governor 71 has kept the rotational speed of the powerplant constant by regulating the rate of flow of fuel to the combustors as described above.

As also described above, the torque modifying lever 154 is arranged to compress spring 187 so as to exert an upward force on lever 172 and thereby decrease the downward force exerted by spring 171 on the torque control rod 173. To effect this "unloading action," the lever 154 is arranged to be moved clockwise about fixed pivot 154a, either by counterclockwise movement of lever 167, as actuated by the temperature control motor 73 or by downward movement of abutment 152 on the speed control piston rod 149.

The operation of the temperature control motor 73 is as follows: When the powerplant starts, with the thermal device 42 cold, the plunger 48 of the thermal device completely blocks the flow of oil through port 49, and therefore oil supplied through conduit 158 to the temperature control motor causes pressure to build up in chamber 73b. This pressure causes the temperature control piston 73a to move downwardly against the bias of spring 165, permitting lever 167 to rotate clockwise so that it exerts no force on lever 154.

When speed governor 71 is inactive, with the fuel pressure being controlled by cam 124 acting on lever 114, the speed control piston 146 is in its lowermost position, as shown in Fig. 1. The abutment 152 on piston rod 149 holds down the right-hand end of torque-modifying lever 154 so that spring 187 is compressed and in the "torque unloading" condition. When the powerplant speed rises to the point where speed governor 71 assumes control, oil pressure acting on piston 146 causes piston rod 149 to rise so that abutment 152 moves free of the bifurcated end 154b of the torque-modifying lever 154. This permits the left-hand end 154c of lever 154 to move downwardly into engagement with the stop 186, so that the unloading spring 187 is permitted to extend to its minimum force position.

As the temperature of the turbine discharge gases increases, the plunger 48 of the thermal device 42 permits a progressive increase in the flow of control oil through the port 49, with the result that the oil pressure in chamber 73b of the temperature control motor 73 decreases, and piston 73a rises under the influence of biasing spring 165. As the piston rod 166 rises, lever 167 moves counterclockwise to produce a clockwise turning movement of the torque-modifying lever 154. As noted above, this results in compression of spring 187 so as to reduce the downward force exerted on the pitch control pilot 173. Thus, when excessive temperatures actuate the thermal device 42, the torque-modifying lever 154 acts to decrease the propeller pitch and thereby decrease the torque setting. With this arrangement, the thermal device 42 reduces the torque setting called for by cam 179 in the event that the cam calls for a torque which would result in an excessive temperature level.

In the event of abnormal underspeed conditions, the speed control piston 146 will descend until the abutment 152 engages the end portion 154b of the torque-modifying lever, moving the latter clockwise. This also compresses spring 187 and decreases the torque setting. Thus, if the manual control shaft 51 should be positioned to call for increasing torque when the rotational speed of the powerplant is below normal rated speed, the torque setting will be automatically adjusted to a value suitable for the reduced speed condition.

In further connection with the operation of the temperature control motor 73, it should be noted that while the initial rise of the temperature control piston 73a acts through lever 167 on the torque-modifying lever 154, the piston rod shoulder 168 will eventually engage the abutment 169. Thus, if the action of the temperature control motor 73 on the torque-modifying lever 154 is not sufficient to reduce the temperature level to a safe value, the shoulder 168 will engage abutment 169 so as to act directly on the fuel pressure control lever 114, moving it upwardly to decrease the fuel supply. Furthermore, motor 73 will thus act on lever 114 during the starting cycle, when the pitch setting is zero, and therefore action of rod 166 on lever 154 through lever 167 would have no effect on the system.

Also in connection with the temperature control motor 73 it will be noted that oil can enter chamber 73b from supply conduit 158 at only a limited rate by reason of the action of the rotary flow restrictor 159, 160. Thus, when plunger 48 of the thermal device 42 moves in a direction to block port 49, as gas temperature decreases, the pressure in chamber 73b of the temperature control motor can increase only at a limited rate. On the other hand when the thermal device 42 acts, by reason of a sudden increase in the temperature level, to decrease the oil pressure in chamber 73b, the temperature control piston 73a responds immediately. With this arrangement, the temperature level at which the powerplant operates may be increased only at a predetermined limited rate; whereas the temperature regulating means responds immediately to decrease the fuel supply in the event of an increase in temperature. This is extremely important from the safety standpoint.

The action of the temperature control motor 73 is further modified under certain conditions by the admission of oil through conduit 162 by the action of the valve 163. After the speed-setting cam 140 is positioned to call for the normal rated speed, in which condition the end portion 136 of lever 135 will be in engagement with the adjustable stop 138, a certain additional increment of rotation of the manual control shaft 51 will cause the portion 137b of push rod 137 to move upwardly relative to the portion 137a, this action being permitted by the spring biased telescopic connection 139. This over-travel of portion 137b brings the reduced rod portion 163a into alignment with conduit 162 so as to permit flow of additional oil from conduit 144 to port 161 associated with flow restrictor 160. Control oil will then be supplied to the temperature control motor 73 through both conduits 162 and 158. This will result in an increased pressure being maintained in chamber 73b, for a given condition of the thermal device 42, so that the temperature control piston 73a will assume a somewhat lower-than-normal position. Thus while the speed setting is held constant, causing governor 71 to maintain normal rated speed, the manual control shaft 51 is permitted to rotate clockwise an additional increment so that the torque-setting cam 179 can call for an additional increment of shaft horsepower output, as may be required in emergency situations, the temperature control motor 73 being temporarily recalibrated so as not to prevent such an increase in output.

The operation of the compensating motor 72 is as follows. As indicated above, the supply of control oil to the compensating motor 72 is controlled by the compensator pilot 190 as positioned by the pressure responsive bellows 191, 192. Bellows 191 is responsive to compressor discharge pressure, the value of which is a joint function of compressor inlet conditions and rotational speed of the compressor. Also, if the compressor efficiency decreases, as by reason of the compressor blading becoming dirty, the discharge pressure will decrease, other factors remaining constant. Since the inlet temperature and pressure vary as a function of altitude, the bellows combination 191, 192 will also be responsive to altitude. In normal operation the governor 71 will maintain the rotational speed constant, therefore the compensating motor 72 will be actuated in accordance with inlet conditions (as affected by changes in altitude, etc.) and will also tend to compensate for changes in compressor efficiency, which has a very material influence on the operation of a gas turbine powerplant of the type described.

In the event of a decrease in compressor discharge pressure (or an increase in altitude) bellows 191 will collapse somewhat causing lever 196 to move clockwise about its pivotal connection with piston rod 72b. This will raise the compensator pilot 190 admitting oil from supply pipe 202 to the lower side of compensator piston 72a by way of ports 204, 206, and conduit 207. The increased pressure on the lower side of piston 72a will cause rod 72b to rise until compensator pilot 190 is restored to the position in which disk 205 again blocks port 204. Upward movement of piston rod 72b will cause the variable fulcrum roller 120 to be positioned to the right so as to effect a decrease in the downward force exerted on piston rod 113 by the main biasing spring 115, as described above. The decreased downward force on rod 115 permits piston 103 to move upwardly so that the fuel pressure control pilot 106 is caused to rise and decrease the control oil pressure in chamber 104 and conduit 105, resulting in a corresponding decrease in fuel pump discharge pressure. Thus it will be seen that the discharge pressure of fuel pump 28 is decreased as altitude increases to automatically provide the decreased fuel rate required for high altitude operation.

Conversely, a decrease in altitude (increase in compressor discharge pressure) causes the bellows 191 to extend, lever 196 moving compensator pilot 190 downwardly to admit oil from the supply conduit 202 to ports 204, 212, through conduit 208 past the check valve 209 to the upper side of compensator piston 72a. The resulting downward movement of piston rod 72b causes the adjustable fulcrum roller 120 to move to the left to increase the downward force produced on piston rod 113 by spring 115, and thereby increase the discharge pressure of the fuel pump 28.

Upward movement of the compensating piston 72a, corresponding to a decrease in compressor discharge pressure, likewise causes the variable fulcrum roller 175 to move to the right. As noted above, this results in a decrease in the force of the lever 172 on the rod 173, thereby decreasing the propeller pitch and the shaft torque. Thus the propeller torque and shaft horsepower output are automatically decreased at higher altitudes, corresponding with the decreased fuel rate effected by the nutcracker linkage 116, 120, 118.

Conversely, an increase in compressor discharge pressure, with corresponding downward movement of piston rod 72b, causes fulcrum roller 175 to move to the left so as to increase the downward force on rod 173, and thereby increase the propeller pitch and shaft torque.

It will be seen that the fuel pump discharge pressure, and therefore the rate at which fuel is supplied to the combustors, and the propeller shaft torque are automatically varied so that the normal power output decreases as a preselected function of certain pressure conditions associated with the compressor, including ambient altitude pressure and compressor discharge pressure. When the compressor discharge pressure decreases (as a result of increase in altitude or for other reasons) compensator pilot 190 rises and oil is supplied directly through conduit 207 to the under side of compensating piston 72a. The piston moves upward promptly because the oil trapped above it is free to return past check valve 209 through conduit 208 to ports 212 and out the drain port 212a and vent 212b. Therefore the compensating action introduced by the bellows 191, 192 takes place promptly for a decreasing compressor pressure level.

On the other hand, when compressor discharge pressure increases, as in a rapid descent or dive, or due to other causes such as an increase in compressor speed, the compensator pilot will move downwardly to admit oil from conduit 202 to the ports 212. Because check valve 209 prevents supply of oil directly to the upper surface of piston 72a through conduit 208, it must flow by way of conduit 211, the rotary flow restrictor 155, 156, 157, thence through conduit 210. By this means, the rate of movement of the compensating piston downwardly is limited to a preselected value. In other words, the compensating action of motor 70 can take place only at a limited rate when the compressor pressure level increases. This has the important effect of preventing an excessive rate of increase in the temperature level due to too rapid increase in the fuel supply caused by sudden increases in compressor discharge pressure.

To facilitate reference in Fig. 2, arrows have been added to indicate the direction of flow in hydraulic lines, as well as the direction of movement of the various mechanical parts. Thus, the arrow adjacent piston rod 113, accompanied by a plus sign, indicates that the rod moves in the direction indicated for an increase in fuel pump discharge pressure. Similarly the arrow adjacent conduit 105, with a plus sign, indicates the direction of control oil flow corresponding to an increasing fuel rate. The arrow adjacent lever 167, with a minus sign, indicates the direction of motion for decreased torque setting. The counterclockwise arrow on pitch control shaft 68, with a plus sign, indicates the "increase pitch" direction of motion; the "plus" arrow on manual control shaft 51 indicates the "increase fuel" motion, etc.

The integrated operation of an aircraft gas turbine powerplant having our improved regulating system may be summarized as follows. During the "starting cycle" of the powerplant, the rotor is accelerated from rest by means of an auxiliary starting motor. When the speed has arisen to approximately 10 per cent of its rated value, the throttle is actuated through its "starting speed range" to rotate the manual control shaft 51 so that the fuel pressure control cam 124 positions pilot 106 to call for increasing fuel pump discharge pressure. When the fuel pressure reaches the proper value, the ignition system initiates combustion in the combustors 3. Further movement of the throttle handle causes the fuel pump discharge pressure to be controlled directly by cam 124. By such control the fuel pressure can be increased until the speed rises to about 60 per cent of the normal rated value. At this point the speed governor 71 assumes control and the abutment 121 floats free of the cam follower 122 with a preselected clearance space therebetween. Further rotation of manual control shaft 51 in its "normal operating range" causes the speed governor 71 to be recalibrated by cam 140 so as to maintain a progressively higher speed until lever 135 engages the adjustable stop 138 corresponding to the normal rated speed. When the speed reaches about 90 per cent of its normal rated value, the torque setting cam 179 actuates the propeller pitch control motor 74 to adjust the blades to a positive angle of attack. This causes an increase in the propeller shaft torque above its minimum value, so that useful horsepower output is produced. Still further movement of manual control shaft 51 in the "normal operating range" causes the cam 179 to increase the propeller blade pitch and shaft torque as a function of the horsepower output desired. It will be noted that, as used herein, the "starting speed range" ends and the "normal operating range" begins at the point where the speed governor assumes control.

Once the normal rated speed is attained, governor 71 will hold the rotational speed constant. In the event of an abnormal underspeed condition, the speed control piston rod 149 will engage the torque-modifying lever 154 so as to decrease the torque setting called for. In the event of a sudden increase in gas temperature, the temperature control piston 73a will promptly rise to first decrease the torque setting by action of the lever 167 on the torque-modifying lever 154, and will subsequently act directly through abutment 169 on the fuel pressure control lever 114 to decrease the fuel pump discharge pressure and reduce the temperature level to a safe limit. An increase of the temperature level is permitted by the thermal device 42 and the temperature control motor 73 at only a limited rate, by reason of the flow restricting device incorporated in the temperature control motor. A temperature level in excess of the normal limit is permitted when the control lever is moved into its "over-travel" position to secure extra power in an emergency. Both the fuel pressure control mechanism and the propeller shaft torque control mechanism are automatically recalibrated so that the normal rated output varies in a desired manner as a function of compressor discharge pressure, compressor efficiency, altitude, etc. Sudden decreases in the pressure level at which the compressor operates are promptly compensated for, while with increasing pressure level the compensation is effected at a limited rate so as to prevent too rapid an increase of the temperature level.

We believe that our control system provides a basically new method for regulation of a prime mover powerplant for the propeller propulsion of a body in a fluid medium, the rotational speed of the prime mover being held constant at a selected value in normal operation while the useful power output is varied by altering the propeller shaft torque, various compensating and safety devices being provided to prevent excessive temperatures and permit effective operation over a wide range of operating conditions.

While our invention has been specifically described as applied to a gas turbine powerplant for aircraft applications, it will be apparent that it may also be applicable to other gas or steam turbine prime mover powerplants for marine propulsion, locomotive applications, or for other uses.

What we claim as new and desire to secure by Letters Patent of the United States, is:

1. In regulating apparatus for a powerplant including a prime mover arranged to drive an adjustable torque load device, means responsive to torque for controlling the load device to maintain the torque substantially constant at a selected value, speed responsive means for controlling the supply of operating medium to the prime mover to maintain rotational speed substantially constant at a selected value, adjusting means for modifying the action of the torque control means to select the torque setting, and adjusting means for modifying the action of the speed control means to select the speed setting, the combination of stop means for determining the maximum speed setting of said second means, means responsive to a temperature condition appurtenant to the operation of the powerplant for modifying the action of the torque and speed control means to prevent excessive temperatures, a common control member having a normal operating range and an emergency over-travel range, means connected with the control member for actuating the torque and speed control means in the normal range, the speed adjusting means including means adapted to effect movement of the control member into the over-travel range with the speed setting held constant by said stop, and means connected with said last-mentioned means for modifying the action of said temperature responsive means to effect emergency operation at temperatures above the normal limit.

2. In regulating apparatus for a powerplant including a prime mover arranged to drive a variable load device, means including a speed governor for controlling the supply of operating medium to the prime mover to maintain rotational speed substantially constant at a selected value, and adjusting means for modifying the action of said operating medium control means to determine the speed setting, the combination of stop means defining the maximum setting of said speed adjusting means, means responsive to a temperature condition appurtenant to the operation of the powerplant for modifying the action of said operating medium control means to prevent excessive temperatures, a control member having a normal operating range and an emergency over-travel range, and means connecting the control member with said adjusting means and including means for effecting movement of the control member into the over-travel range with the speed setting held constant at the value determined by said stop, and means associated with said connecting means and adapted to modify the action of said temperature responsive means to effect emergency operation at temperatures above the normal limit when the control member is in the over-travel range.

3. In regulating apparatus for a gas turbine propulsion powerplant with a rotor driving an adjustable pitch propeller, torque responsive means for automatically controlling propeller pitch to maintain the propeller torque substantially constant at a selected value, and means responsive to rotor speed for automatically controlling the supply of fuel to the gas turbine to maintain the speed substantially constant at a preselected value, the combination of spring biasing means engaging the torque responsive means and urging said means in a direction to reduce said selected torque value, movable abutment means engaging said biasing means whereby the force exerted by the biasing means on the torque responsive means may be varied, and means connecting said abutment means to the speed responsive device for positioning said abutment whereby the setting of the torque responsive means is automatically decreased upon a decrease in rotor speed below the normal rated value.

4. In regulating apparatus for a gas turbine propulsion powerplant with a rotor driving a variable pitch propeller, means for automatically controlling the propeller pitch to maintain torque supplied to the propeller substantially constant at a selected value, and means responsive to rotor speed for automatically controlling the supply of fuel to the powerplant to maintain rotor speed substantially constant, the combination of means engaging and exerting a biasing force on the pitch control means in the direction to reduce said selected value, means responsive to a temperature condition appurtenant to the operation of the powerplant, means positioned by said temperature responsive means connected to said biasing means for varying the force thereof whereby said pitch control means is caused to move in a direction to decrease said selected torque value upon a predetermined rise in temperature, and means positioned by said temperature responsive means connected to the fuel control means to reduce the fuel supply upon a predetermined further rise in temperature.

5. In regulating apparatus for a gas turbine propulsion powerplant with a rotor driving a variable pitch propeller, means for automatically controlling the propeller pitch to maintain propeller torque substantially constant at a selected value, and means responsive to rotor speed for automatically controlling the supply of fuel to the powerplant to maintain rotor speed substantially constant, the combination of means engaging said pitch control means and adapted to exert a biasing force thereon in a direction to reduce said selected torque value, movable abutment means positioned by the speed responsive means engaging said biasing means for varying the force exerted by said biasing means on said pitch control means whereby said selected torque value maintained by said pitch control means is automatically decreased upon a decrease in rotor speed below the normal rated value, means responsive to a temperature condition appurtenant to the operation of the powerplant, means positioned by said temperature responsive means also engaging said biasing means for varying the force thereof exerted on said pitch control means whereby a decrease in said selected torque value is effected upon a predetermined rise in temperature, and means positioned by said temperature responsive means connected to said fuel supply control means to reduce the fuel supply upon a predetermined further rise in temperature.

6. In regulating apparatus for a gas turbine propulsion powerplant with a rotor driving a variable pitch propeller and having a starting speed range and a normal operating speed range, means for automatically controlling propeller pitch to maintain propeller torque substantially constant at a selected value, fuel supply means including regulating valve, means responsive to rotor speed connected to said valve means for automatically controlling the supply of fuel to the powerplant to maintain speed substantially constant at a selected value, said speed responsive means being operative only at speeds in the normal range, the combination of a common control member having an initial range of positions corresponding to the starting speed range and an intermediate and extreme range of positions corresponding to the normal operating speed range, first means connecting the control member to the torque control means to maintain the torque setting at a minimum value in the initial range of positions of the control member, second means connecting the control member to the speed responsive means to progressively increase said selected value through the initial and intermediate range of positions of the control member, and third means connecting the control member directly to said valve means, means whereby the rate of fuel supply is controlled in the initial range of positions of the control member where the speed governor is inoperative.

7. Regulating apparatus in accordance with claim 6 and including means responsive to a temperature condition appurtenant to the operation of the gas turbine connected to the pitch control means to decrease said selected torque value automatically upon a predetermined rise in temperature when rotor speed is in the normal operating range, and means actuated by said temperature responsive means connected to said regulating valve means to reduce the fuel supply upon a predetermined further increase in temperature.

8. In regulating apparatus for an aircraft gas turbine propulsion powerplant including a compressor arranged to induct ambient air, a combustor, a turbine with a shaft arranged to drive a variable pitch propeller, means for automatically varying the pitch of the propeller to maintain shaft torque substantially constant at a selected value, and means for controlling the supply of fuel to the combustor, the combination of automatic compensating means including a first device responsive to compressor inlet pressure, a second device responsive to compressor discharge pressure acting in opposition to said first device, motor means connected to said first and second devices and controlled by the combined action thereof in accordance with changes in compressor inlet pressure and pressure ratio, and means connecting said motor means to said pitch varying means for automatically altering said selected torque value as a function of changes in altitude and compressor performance.

9. In regulating apparatus for a gas turbine propulsion powerplant including a compressor, a combustor, and a turbine arranged to drive a variable torque load device, means for automatically varying the load device to maintain the torque input thereto substantially constant at a selected value, and means including a speed responsive governor for varying the supply of fuel to the combustor to maintain rotational speed of the turbine substantially constant at a selected value, the combination of automatic compensating means including a device responsive to changes in the compressor pressure ratio, motor means connected to and controlled by said pressure responsive device, and means connecting said motor means to said load varying means to reduce said selected torque value as a predetermined function of changes in the compressor pressure ratio, and means for limiting the rate of response of said compensating means only when said compensating means moves in a direction to increase said selected torque value.

10. Apparatus for controlling an internal combustion engine and the pitch of a variable pitch propeller driven thereby, comprising a fuel flow control system including a fuel control element having a neutral position in which the fuel flow remains constant and effective upon opposite movements from said position to cause variation of the fuel flow in opposite sense, means for applying a force indicative of the rate of fuel flow to said element in a fuel flow decreasing direction, and means for applying a variable fuel controlling force to said element in a fuel flow increasing direction; a propeller torque control system including a torque control element having a neutral position in which the propeller pitch remains constant and effective upon opposite movements from said position to cause variation of the pitch in opposite senses, means for applying a force indicative of the propeller torque to said torque control element in a pitch decreasing direction, and means for applying a variable torque controlling force to said torque control element in a pitch increasing direction; each of said controlling force applying means comprising a pair of levers having facing plane surfaces and each pivoted at one end, a bearing lying between and slidable along said surfaces, a spring acting on the free end of one of said levers and biasing it into engagement with said bearing, a connection between the free end of the other of said levers and its associated control element, and means for moving said bearing to vary the mechanism advantage between said spring and said associated control element; and means response to the rate of flow of air through said engine for operating both said bearing moving means.

HUGH M. OGLE.
DONALD E. GARR.
MARTIN A. EDWARDS.

References Cited in the file of this patent

UNITED STATES PATENTS

| Number | Name | Date |
|---|---|---|
| 2,263,705 | Seippel | Nov. 25, 1941 |
| 2,292,288 | Pateras Pescara | Aug. 4, 1942 |
| 2,306,953 | Jung | Dec. 29, 1942 |
| 2,322,303 | Martin | June 22, 1943 |
| 2,336,232 | Doran | Dec. 7, 1943 |
| 2,343,378 | Kieser | Mar. 7, 1944 |
| 2,401,497 | Mercier | June 4, 1946 |
| 2,457,595 | Orr | Dec. 28, 1948 |